(12) United States Patent
Zhang et al.

(10) Patent No.: US 12,560,826 B2
(45) Date of Patent: Feb. 24, 2026

(54) DEVICES WITH NEAR-FIELD COMMUNICATIONS

(71) Applicant: Apple Inc., Cupertino, CA (US)

(72) Inventors: Lijun Zhang, Los Gatos, CA (US); Jiangfeng Wu, San Jose, CA (US); Mattia Pascolini, San Francisco, CA (US); Siwen Yong, San Francisco, CA (US); Yi Jiang, Cupertino, CA (US)

( * ) Notice: Subject to any disclaimer, the term of this patent is extended or adjusted under 35 U.S.C. 154(b) by 367 days.

(21) Appl. No.: 18/172,906

(22) Filed: Feb. 22, 2023

(65) Prior Publication Data

US 2023/0305321 A1     Sep. 28, 2023

Related U.S. Application Data

(63) Continuation of application No. PCT/US2021/048268, filed on Aug. 30, 2021.

(60) Provisional application No. 63/075,660, filed on Sep. 8, 2020.

(51) Int. Cl.
*G02C 11/00*          (2006.01)
*G02C 7/08*           (2006.01)

(52) U.S. Cl.
CPC .............. *G02C 11/10* (2013.01); *G02C 7/086* (2013.01); *G02C 2200/02* (2013.01)

(58) Field of Classification Search
CPC .... G02C 11/10; G02C 7/086; G02C 2200/02; G02C 9/04; G02B 27/017; G02B 27/0172
USPC ........................................ 351/158
See application file for complete search history.

(56) References Cited

U.S. PATENT DOCUMENTS

| | | | |
|---|---|---|---|
| 8,964,298 B2 | 2/2015 | Haddick et al. | |
| 9,097,891 B2 | 8/2015 | Border et al. | |
| 9,600,069 B2 | 3/2017 | Publicover et al. | |
| 2010/0110368 A1 | 5/2010 | Chaum | |
| 2011/0227813 A1 | 9/2011 | Haddick et al. | |
| 2015/0005606 A1* | 1/2015 | Honore ................ | A61B 5/0026 |
| | | | 600/365 |
| 2015/0061837 A1* | 3/2015 | Honore .............. | G06K 7/10386 |
| | | | 340/10.31 |
| 2016/0262608 A1 | 9/2016 | Krueger | |

(Continued)

FOREIGN PATENT DOCUMENTS

| | | |
|---|---|---|
| CN | 204360401 U | 5/2015 |
| CN | 210573071 U | 5/2020 |
| WO | 2018046892 A1 | 3/2018 |

*Primary Examiner* — William R Alexander

(74) *Attorney, Agent, or Firm* — Treyz Law Group, P.C.; Tianyi He

(57)          ABSTRACT

A head-mounted device may have a head-mounted housing. The head-mounted housing may have displays that display images for a user through lenses. The displays and lenses may be mounted in left and right optical modules. Attachment structures such as magnets may be used to removably attach left and right vision correction lenses to the left and right optical modules, respectively. The images may be viewed from eye boxes through the vision correction lenses while the head-mounted device is being worn by the user. The vision correction lenses and the head-mounted device may be provided with near-field communications antennas. The antennas may be formed from coils that surround corrective lens elements in the vision correction lenses. In the head-mounted device, antennas may be formed from coils surrounding the lenses in the optical modules and/or may include other coil(s).

20 Claims, 6 Drawing Sheets

(56)           References Cited

U.S. PATENT DOCUMENTS

| | | | |
|---|---|---|---|
| 2017/0097524 A1* | 4/2017 | Honoré | A61B 5/0026 |
| 2019/0025587 A1 | 1/2019 | Osterhout et al. | |
| 2019/0041644 A1 | 2/2019 | Abele et al. | |
| 2019/0290192 A1* | 9/2019 | Pugh | A61B 5/18 |
| 2019/0325734 A1* | 10/2019 | Zdeblick | G16H 40/67 |
| 2020/0096775 A1 | 3/2020 | Franklin et al. | |
| 2020/0153204 A1* | 5/2020 | Hatzilias | H01S 5/18347 |
| 2021/0083455 A1* | 3/2021 | Hatzilias | H01S 5/18394 |

* cited by examiner

8

DEVICES WITH NEAR-FIELD COMMUNICATIONS

This application is a continuation of international patent application No. PCT/US2021/048268, filed Aug. 30, 2021, which claims priority to U.S. provisional patent application No. 63/075,660, filed Sep. 8, 2020, which are hereby incorporated by reference herein in their entireties.

FIELD

This relates generally to electronic devices, and, more particularly, to electronic devices such as head-mounted devices.

BACKGROUND

Electronic devices such as head-mounted devices may have displays for displaying images. A user may view displayed images while wearing a head-mounted device.

SUMMARY

A head-mounted device may have a head-mounted housing. The head-mounted housing may support left and right optical modules that are aligned with the left and right eyes of a user, respectively. The optical modules may contain displays for displaying images and lenses through which the images may viewed.

Attachment structures such as magnets may be used to removably attach left and right vision correction lenses to the left and right optical modules, respectively. During operation, display images may be viewed from eye boxes through the vision correction lenses.

The vision correction lenses and the head-mounted device may be provided with near-field communications antennas. The antennas may be formed from coils that surround corrective lens elements in the vision correction lenses. In the head-mounted device, antennas may be formed from coils surrounding the lenses in the optical modules and/or may include other coil(s).

Information such as vision correction information and other information may be stored in the vision correction lenses and transmitted from the vision correction lenses to the head-mounted device using near-field communications. The head-mounted device may adjust content being displayed on the displays or may take other action in response to near-field communications information received from the vision correction lenses.

DETAILED DESCRIPTION

A head-mounted device may include a head-mounted support structure that allows the device to be worn on the head of a user. The head-mounted device may have displays that are supported by a head-mounted support structure so that the displays may display images to the user while the head-mounted device is being worn. To communicate with other devices, the head-mounted device may be provided with wireless communications circuitry. The wireless communications circuitry may include antennas. The antennas may include near-field communications antennas that operate over relatively short distances. For example, the head-mounted device may have one or more near-field communications antennas with a range of less than 20 cm, less than 10 cm, less than 5 cm, 0-25 cm, 0-15 cm, or other suitable range. By using near-field communications, information may be securely transmitted between external devices and the head-mounted device.

Figure 1:
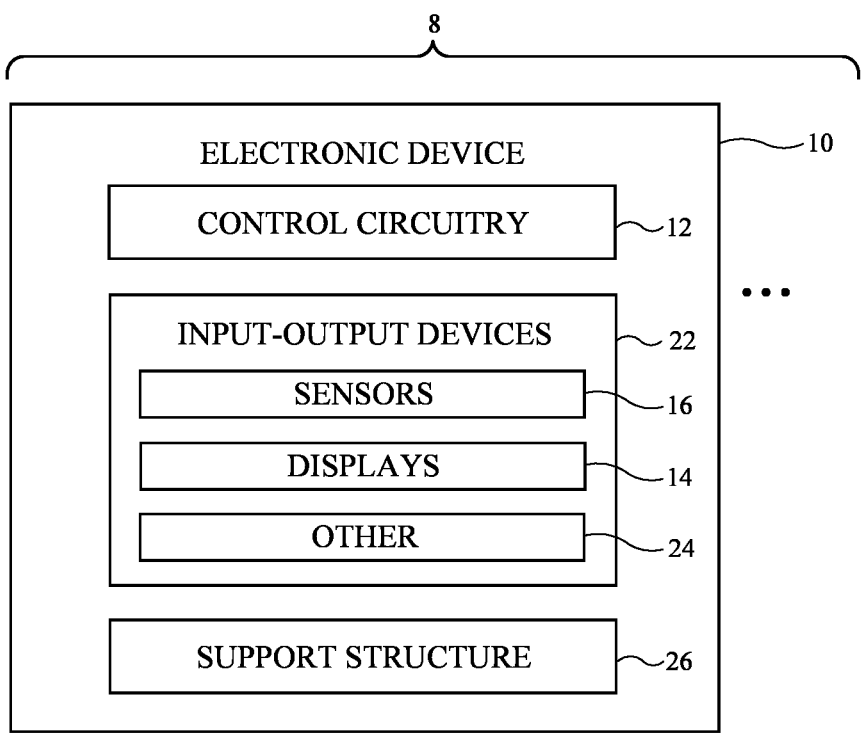
FIG. 1 is a schematic diagram of an illustrative system with an electronic device in accordance with an embodiment.

A schematic diagram of an illustrative system that may include a head-mounted device with near-field communications circuitry is shown in FIG. 1. As shown in FIG. 1, system 8 may have one or more electronic devices 10. Devices 10 may include a head-mounted device, accessories such as headphones, components that are removably attached to a head-mounted device or other electronic device, associated computing equipment (e.g., a cellular telephone, tablet computer, laptop computer, desktop computer, and/or remote computing equipment that supplies content to a head-mounted device), and/or other devices (e.g., devices that communicate with a head-mounted device).

Each electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, near-field communications circuitry, and/or other wireless communications circuitry.

To support interactions with external equipment, control circuitry 12 may be used in implementing communications protocols. Communications protocols that may be implemented using control circuitry 12 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, multiple-input and multiple-output (MIMO) protocols, antenna diversity protocols, satellite navigation system protocols such as global positioning system (GPS) protocols and global navigation satellite system (GLONASS) protocols, IEEE 802.15.4 ultra-wideband communications protocols or other ultra-wideband communications protocols, near-field communications protocols, etc.

During operation, the communications circuitry of the devices in system 8 (e.g., the communications circuitry of control circuitry 12 of device 10) may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as displays 14. In some configurations, device 10 (e.g., a head-mounted device) includes left and right display devices. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively.

During operation, displays 14 may be used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles).

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional light detection and ranging sensors, sometimes referred to as lidar sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors (e.g., strain gauges, capacitive force sensors, resistive force sensors, etc.), sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 (e.g., a head-mounted device) may have head-mounted support structures such as head-mounted support structure 26 (e.g., head-mounted housing structures such as housing walls, headbands, etc.). The head-mounted support structure may be configured to be worn on a head of a user (e.g., against the user's face covering the user's eyes) during operation of device 10 and may support displays 14, sensors 16, other components 24, other input-output devices 22, and control circuitry 12.

Figure 2:
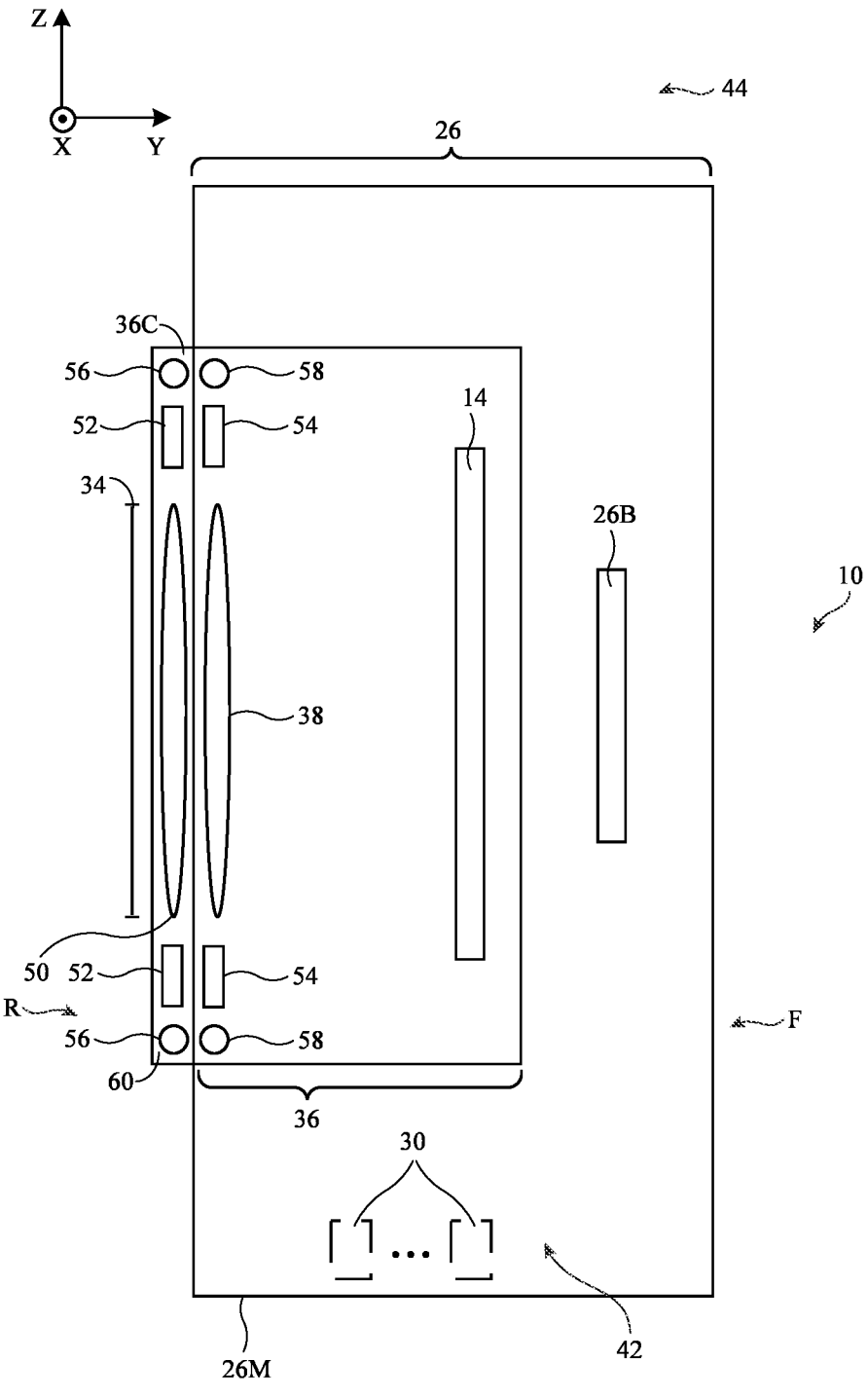
FIG. 2 is a side view of an illustrative electronic device such as a head-mounted device in accordance with an embodiment.

FIG. 2 is a side view of an illustrative head-mounted electronic device. Head-mounted support structure 26 of device 10, which may sometimes be referred to as a housing or enclosure, may have walls or other structures that separate an interior region of device 10 such as interior region 42 from an exterior region surrounding device 10 such as exterior region 44. Electrical components 30 (e.g., integrated circuits, sensors, control circuitry, input-output devices, etc.) may be mounted on printed circuits and/or other structures within device 10 (e.g., in interior region 42).

To present a user with images for viewing from eye boxes such as eye box 34, device 10 may include displays such as display 14 and lenses such as lens 38. These components may be mounted in optical modules such as optical module 36 (e.g., a lens barrel) to form respective left and right optical systems. There may be, for example, a left display in a left optical module for presenting an image through a left lens to a user's left eye in a left eye box and a right display in a right optical module for presenting an image to a user's right eye in a right eye box. The user's eyes are located in eye boxes 34 when rear face R of structure 26 rests against the outer surface of the user's face. To accommodate different interpupillary distances, the lateral separation between the left and right optical modules in device 10 may be manually and/or automatically adjusted (E.g. using electrically adjustable actuators).

Support structure 26 may include a main housing support structure such as portion 26M. An optional forward-facing publicly viewable display may be mounted on front side F of portion 26M.

Different users may have different vision correction needs. Users with perfect vision may use device 10 without vision correction components. User who have vision correction needs may be provided with removable vision correction lenses such as lens 36C. The user may be provided with a left vision correction lens to correct for vision defects in the user's left eye and may be provided with a right vision correction lens to correct for defects in the user's right eye. Each vision correction lens may have a corresponding vision-correcting lens element such as vision-correcting lens element 50 mounted in a vision correction lens housing such as housing 60. Adjustable lenses 36C may use lens elements 50 to correct for vision defects such as myopia, hyperopia, presbyopia, astigmatism, higher-order aberrations, and/or other vision defects.

Device 10 (e.g., each optical module 36 in device 10) may have structures that facilitate removable attachment of a vision correction lens to the rear-facing side of a corresponding optical module 36. For example, each optical module 36 may have attachment structures 54 that are used with corresponding attachment structures 52 in housing 60 of a respective vision correction lens 36C. Structures 54 may be magnets, magnetic members (e.g., iron bars) that are attracted to magnets, may be a snaps, clip, or other mechanically interlocking features, may have threads, and/or may be other structures for receiving and removably attaching vision correction lenses 36C to device 10 in alignment with respective optical modules 36. When vision correction lenses 36C are attached to optical modules 36, a user with vision defects will be able to clearly view content through the vision correction lenses and optical module lenses 38 that is being displayed by the left and right displays of device 10.

Each vision correction lens 36C may be provided with control circuitry and/or other components (e.g., some or all of the circuitry of the electronic device of FIG. 1). To support communications with a head-mounted device 10, each vision correction lens 36C may have near-field communications circuitry. Device 10 may have corresponding near-field communications circuitry.

Using near-field communications antennas in device 10 and lenses 36C, information may be exchanged between device 10 and lenses 36C. As an example, a user's eyeglasses prescription that has been implemented using lens element 50 and/or other user information may be stored in each lens 36C. When the user attaches each lens 36C to device 10, device 10 can communicate with that lens via near-field communications (e.g., to obtain user information such as the user's eyeglasses prescription or other information). Device 10 may then adjust its operation based in the obtained information.

As an example, if a user's eyesight is restricted to a narrow field of view, information on this vision defect may be stored in lenses 36C. When lenses 36C are attached to device 10, device 10 can be informed that the user has vision with a restricted field of view and can reduce the lateral dimensions of the images displayed on displays 14 to accommodate this vision defect. User information in lenses 36C may also be used as a key to unlock device 10, may be used to identify the user (e.g., so that device 10 can present user-specific menu options on displays 14 and/or may display images containing information associated with a user's online account), etc.

To support near-field communications, lenses 36C and device 10 may be provided with near-field communication antennas. The antennas may, for example, be antennas formed from coiled wires and/or other coils (e.g., coils formed from metal traces on a printed circuit, a polymer substrate such as a molded polymer member, and/or other coils). Each coil may have a single turn or may have two or more turns. The use of multiple turns in each antenna coil may help enhance antenna sensitivity. The use of a single turn (or fewer turns in a multi-coil arrangement) may help reduce bulk.

As shown in FIG. 2, each lens 36C may have a coil that surrounds the vision correction lens element 50 of that lens to form a corresponding near-field communications antenna (antenna 56). When viewed along the Y direction of FIG. 2, for example, lens element 50 may have a circular shape or other suitable shape and the coil forming antenna 56 may extend around the peripheral edge of lens element (e.g., to form a circular ring or a ring of other suitable shape). One or more corresponding near-field communications antennas may be provided in device 10 to communicate with antenna 56. As shown in the example of FIG. 2, each optical module such as optical module 36 of FIG. 2 may be provided with a corresponding coil to form an associated near-field communications antenna such as antenna 58. The coil forming antenna 58 may extend in a ring around the peripheral edge of lens 38. By surrounding lens 38 in this way, antenna 58 may overlap and be aligned with antenna 56 (e.g., antennas 56 and 58 may lie in planes that are parallel to each other and may be concentric). With this approach, the left optical module of device 10 may use its near-field communications antenna to communicate with a left vision correction lens attached to the left optical module and the right optical module of device 10 may use its near-field communications antenna to communicate with a right vision correction lens attached to the right optical module.

Figure 3:
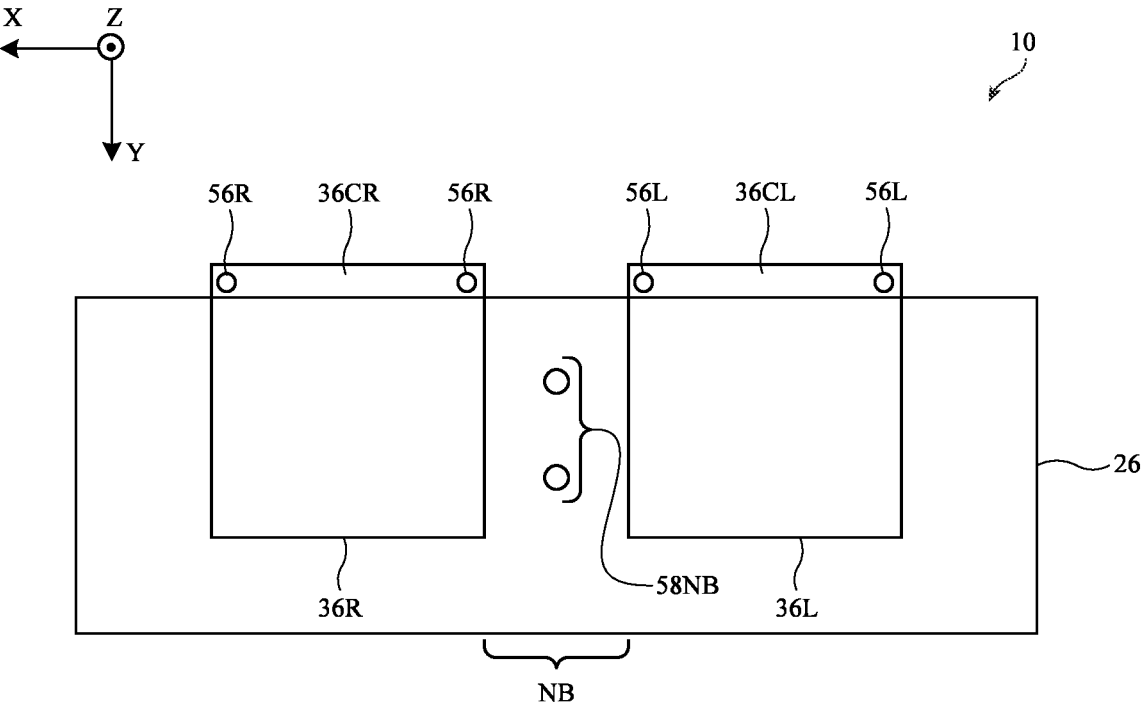
FIG. 3 is a top view of an illustrative head-mounted device in accordance with an embodiment.

If desired, device 10 may use a single near-field communications antenna to communicate with the near-field communications antennas 56 of both left and right vision correction lenses. This type of arrangement is shown in FIG. 3. In the top view of device 10 of FIG. 3, head-mounted electronic device near-field communications antenna 58NB is located near the center of head-mounted support structure 26 (e.g., in nose bridge portion NB, which is configured to rest over a user's nose). Antenna 58NB may be configured to communicate via near-field communications with vision-correction lens near-field communications antenna 56L in left vision correction lens 36CL and with vision correction lens near-field communications antenna 56R in right vision correction lens 36CR. The amount of electromagnetic near-field coupling between antenna 58NB and antennas 56R and 56L may be less than the amount of electromagnetic near-field coupling between the left and right head-mounted device antennas of FIG. 2 and their corresponding left and right vision correction lens antennas due to the position of antenna 58NB within nose bridge portion NB (as opposed to forming a set of concentric overlapped antenna coils). Nevertheless, the total number of near-field antennas used in device 10 may be reduced using an arrangement of the type shown in FIG. 3, which may help to reduce the size of device 10.

Figure 4:
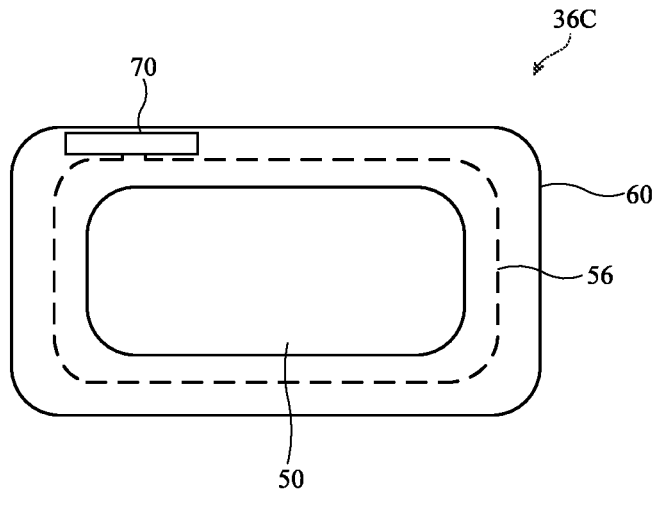
FIG. 4 is a rear view of an illustrative removable vision correction lens with near-field communications capabilities in accordance with an embodiment.
Figure 5:
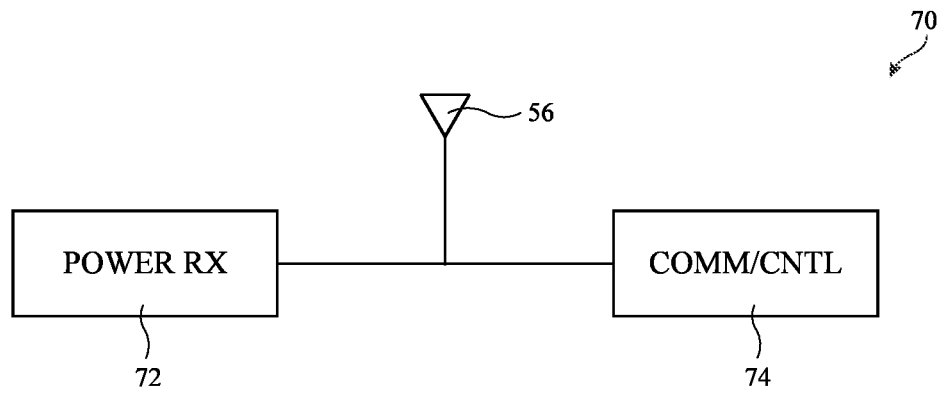
FIG. 5 is a circuit diagram of illustrative near-field communications circuitry in accordance with an embodiment.

FIG. 4 is a diagram of an illustrative vision correction lens. As shown by lens 36C of FIG. 4, vision correction antenna 56 may be supported by a ring-shaped housing member such as housing member 60, which surrounds and supports vision correction lens element 50 for vision-correction lens 36. Each lens 36C may include circuitry 70 (e.g., one or more integrated circuits, etc.) that is coupled to the vision correction lens near-field antenna 56 of that lens. As shown in FIG. 5, circuitry 70 may include power harvesting circuitry such as power receiving circuitry 72 (e.g., a wireless power receiving circuit such as a rectifier, a capacitor, battery, or other energy storage device, voltage regulator circuitry, etc.). Circuitry 72 may be used to harvest energy from the near-field signals that are transmitted by the near-field communications circuitry of device 10 and that are received by antenna 56 (e.g., circuitry 72 may receive wireless signals from device 10 that serve as wireless power signals). If desired, circuitry 70 may include batteries that are recharged via wired connections, replaceable batteries (e.g., non-rechargeable batteries), and/or other power sources.

Using power from circuitry 72, control and communications circuitry 74 may communicate with device 10. Circuitry 74, which may include, for example, control and communications circuitry such as control circuitry 12 of FIG. 1, may have a near-field communications receiver for receiving near-field communications data that has been transmitted by a corresponding near-field communications transmitter in device 10 and may have a near-field communications transmitter for transmitting near-field communications data to a near-field communications receiver in device 10. In this way, lens 36C may transit data to device 10 (e.g., at power-up, when lens 36C is attached to device 10, and/or at other suitable times) and/or device 10 may transmit data to lens 36C. Near-field communications between removable vision correction lenses and device 10 may be performed at a near-field communications frequency of 13.56 MHz, less than 100 MHz, less than 50 MHz, less than 25 MHz, less than 5 MHz, at least 10 kHz, at least 100 kHz, and/or other suitable near-field communications frequency.

Figure 6:
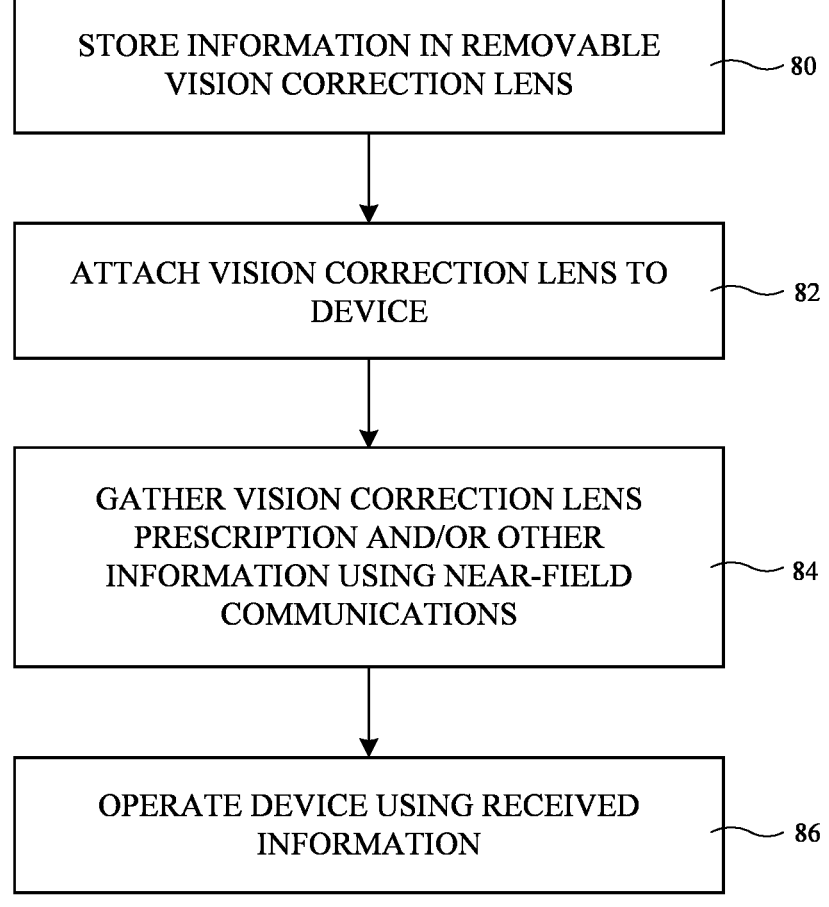
FIG. 6 is a flow chart of illustrative operations involved in using a head-mounted device in accordance with an embodiment.

Illustrative operations associated with using device 10 and vision correction lenses 36C are shown in the flow chart of FIG. 6.

During the operations of block 80, information associated with the user of device 10 and lenses 36C, information associated with lenses 36, information associated with device 10, and/or other information may be stored in the control circuitry of lenses 36C (e.g., in circuitry 74 of circuitry 70 of FIG. 4). As an example, this information may be stored in lenses 36C during manufacturing, during a registration process after manufacturing, during use of device 10, or at another suitable time. The information stored in the storage of lenses 36C may include information concerning a user's vision correction needs (e.g., the user's eyeglasses prescription, which is used in forming corrective lens elements 50, and/or other information on the user's vision defects), information on the user's identity (e.g., a user's full name, a username, an email address, or other user identifier), biometric information, information on a user's account settings (e.g., for an online account or other account associated with device 10), information on a user's preferences (e.g., user-selected settings such as display settings, content preferences, etc.), information on an interpupillary distance setting for the user that is to be used in establishing the lateral separation between optical modules 36 to accommodate the user's interpupillary distance, a cryptographic key, and/or other information.

If not already attached to device 10, lenses 36C may be removably coupled to corresponding optical modules 36 in device 10 during the operations of block 82.

During the operations of block 84, device 10 and lenses 36C may use the near-field communications antennas of device 10 and lenses 36C to communicate. As an example, device 10 may transmit information to lenses 36C to store in lenses 36C and/or some or all of the information stored in each lens 36C may be transmitted via near-field communications to one or more near-field antennas in device 10. The information transmitted from lenses 36C to device 10 may include a cryptographic key or other information used to unlock device 10 for the user, may include information on the user's vision defects so that device 10 can be adjusted accordingly, may include lens prescription information (e.g., the lens power and other lens attributes of corrective lens elements 50), may include information on a user's interpupillary distance, may include the user's identity (e.g., a user identifier such as a username), and/or may include other information.

In some scenarios, device 10 may transfer information to lenses 36C by near-field communications. For example, a user-specific device setting such as a user interpupillary distance setting, a user content preference, a user account setting, and/or other information may be transmitted wirelessly from device 10 to lenses 36C and stored in lenses 36C for subsequent use (e.g., subsequent retrieval by device 10 from lenses 36C). In some configurations, device 10 may obtain information via near-field communications from devices other than lenses 36C. For example, device 10 may, during the operations of block 84, obtain the same types of information that are provided from lenses 36C and/or different types of information (e.g., a user identifier, payment authorization information, etc.) from a nearby device such as a cellular telephone that has near-field communications circuitry that communicates with the near-field communications antenna of device 10.

During the operations of block 86, device 10 may be operated by the user. Device 10 may, as an example, be used to display images for the user (e.g., displays 14 in optical modules 36 may display content for the user). While operating, device 10 may use the information received from lenses 36C using the near-field communications circuitry. As an example, the size of the images presented by control circuitry 12 of device 10 on displays 14 may be adjusted based on received information on the user's ability to view content at the periphery of the user's vision. A user with a restricted field of view may, as an example, be provided with content that has been reduced in size to fit within the user's field of view. If desired, device 10 may adjust the operation of device 10 based on the user's identity (as received, for example, in a user identifier or other information from one or more lenses 36C). Device 10 may, for example, provide the user with a list of content suggestions based on the user's preferences. As another example, one or both of lenses 36C may be used as keys to unlock device 10. When lenses 36C are not present, device 10 may remain in a locked state (e.g., device 10 may be prevented from displaying images and/or may block access to a user's account and/or other information associated with a user). In response to verifying that a user is present by obtaining a user identifier, a cryptographic key associated with a user, or other appropriate information that serves as a digital key for the user, device 10 may unlock the user's account and may allow the user to freely access the capabilities of device 10. These are illustrative examples. Other actions may be taken in response to obtaining information from lenses 36C or other electronic equipment via near-field communications if desired.

In accordance with an embodiment, a head-mounted device operable with removable vision correction lenses that transmit near-field communications signals is provided that includes a head-mounted support structure; left and right displays that are supported by the head-mounted support structure and that are configured to provide images viewable from eye boxes through the removable vision correction lenses; and a near-field communications antenna configured to receive the transmitted near-field communications signals.

In accordance with another embodiment, the eye boxes include a left eye box and a right eye box and the removeable vision correction lenses include a left vision correction lens and a right vision correction lens, the head-mounted device includes attachment structures configured to removably couple the vision correction lenses to the head-mounted support structure; a left lens, a left image from the left display is visible from the left eye box through the left lens and the left vision correction lens; and a right lens, a right image from the right display is visible from the right eye box through the right lens and the right vision correction lens, the near-field communications antenna includes a coil that extends around the right lens.

In accordance with another embodiment, the attachment structures include magnets configured to attract corresponding magnets in the removable vision correction lenses.

In accordance with another embodiment, vision correction lenses include left and right vision correction lenses, the head-mounted support structure includes a nose bridge portion, and the near-field communications antenna is in the nose-bridge portion and is configured to receive the transmitted near-field communications signals from the left and right vision correction lenses.

In accordance with another embodiment, the near-field communications antenna is configured to operate at a frequency of less than 100 MHz In accordance with another embodiment, the transmitted near-field communications signals include vision correction information and the left and right displays are configured to display the images based on the vision correction information of the transmitted near-field communications signals.

In accordance with another embodiment, the transmitted near-field communications signals include an identifier and the displays are configured to display the images based on the identifier.

In accordance with an embodiment, a head-mounted device operable with left and right vision correction lenses is provided that includes left and right optical modules, the left optical module has a left display and a left lens that are configured to display a left image in a left eye box through the left vision correction lens and the right optical module has a right display and a right lens that are configured to display a right image in a right eye box through the right vision correction lens; a left antenna in the left optical module; and a right antenna in the right optical module.

In accordance with another embodiment, the left antenna includes a left coil that is configured to receive near-field communications signals from the left vision correction lens and the right antenna includes a right coil that is configured to receive near-field communications from the right vision correction lens.

In accordance with another embodiment, the left coil extends around a peripheral edge of the left lens and the right coil extends around a peripheral edge of the right lens.

In accordance with another embodiment, the near-field communications signals received by the left and right coils include signals at a frequency of less than 100 MHz.

In accordance with another embodiment, the head-mounted device includes magnets configured to removably attach the left and right vision correction lenses respectively to the left and right optical modules in alignment with the left and right lenses.

In accordance with another embodiment, the left and right vision correction lenses include respective left and right vision correction lens elements and include respective left and right near-field communications antennas that respectively surround the left and right vision correction lens elements, and the left and right coils are configured to align respectively with the left and right near-field communications antennas of the left and right vision correction lenses when the left and right vision correction lenses are coupled to the left and right optical modules.

In accordance with another embodiment, the head-mounted device includes control circuitry configured to take action in response to receiving the near-field communications signals.

In accordance with another embodiment, the near-field communications signals include vision correction information and the control circuitry is configured to take action based on the vision correction information.

In accordance with another embodiment, the near-field communications signals include user information and the control circuitry is configured to take action based on the user information.

In accordance with another embodiment, the head-mounted device includes magnets configured to removably attach the left and right vision correction lenses respectively to the left and right optical modules in alignment with the left and right lenses.

In accordance with an embodiment, a head-mounted device vision correction lens configured to removably couple to a head-mounted device is provided that includes a vision correction lens housing; a vision correction lens element in the vision correction lens housing; a coil in the vision correction lens housing, the coil is configured to form a near-field communications antenna; and near-field communications circuitry coupled to the coil that is configured to transmit near-field communications signals to a head-mounted device using the near-field communications antenna.

In accordance with another embodiment, the coil extends around the vision correction lens element.

In accordance with another embodiment, the near-field communications circuitry is further configured to use the near-field communications antenna to receive wireless power from the head-mounted device.

The foregoing is merely illustrative and various modifications can be made to the described embodiments. The foregoing embodiments may be implemented individually or in any combination.

What is claimed is:

1. A head-mounted device operable with removable vision correction lenses that transmit near-field communications signals, comprising:

a head-mounted support structure;

left and right displays that are supported by the head-mounted support structure and that are configured to provide images viewable from eye boxes through the removable vision correction lenses; and a near-field communications antenna configured to receive the transmitted near-field communications signals, wherein the near-field communications antenna comprises a coil configured to couple with a corresponding coil in a given removable vision correction lens of the removable vision correction lenses when the given removable vision correction lens is attached to the head-mounted support structure.

2. The head-mounted device defined in claim 1, wherein the eye boxes include a left eye box and a right eye box, wherein the given removable vision correction lens is a right vision correction lens, and wherein the removable vision correction lenses comprise a left vision correction lens, the head-mounted device further comprising:

attachment structures configured to removably couple the removable vision correction lenses to the head-mounted support structure;

a left lens, wherein a left image from the left display is visible from the left eye box through the left lens and the left vision correction lens; and a right lens, wherein a right image from the right display is visible from the right eye box through the right lens and the right vision correction lens, and wherein the the coil of the near-field communications antenna extends around the right lens.

3. The head-mounted device defined in claim 2 wherein the attachment structures comprise magnets configured to attract corresponding magnets in the removable vision correction lenses.

4. The head-mounted device defined in claim 1 wherein the given removable vision correction lens is a right vision correction lens, wherein the removable vision correction lenses include a left vision correction lens, wherein the head-mounted support structure comprises a nose bridge portion, and wherein the near-field communications antenna is in the nose bridge portion and is configured to receive the transmitted near-field communications signals from the left and right vision correction lenses.

5. The head-mounted device defined in claim 1 wherein the near-field communications antenna is configured to operate at a frequency of less than 100 MHZ.

6. The head-mounted device defined in claim 1 wherein the transmitted near-field communications signals comprise vision correction information and wherein the left and right displays are configured to display the images based on the vision correction information of the transmitted near-field communications signals.

7. The head-mounted device defined in claim 1 wherein the transmitted near-field communications signals comprise an identifier and wherein the left and right displays are configured to display the images based on the identifier.

8. The head-mounted device defined in claim 1 further comprising:

an additional lens that is supported by the head-mounted support structure and that is overlapped by the given removable vision correction lens when the given removable vision correction lens is attached to the head-mounted support structure.

9. A head-mounted device operable with left and right vision correction lenses, comprising:

left and right optical modules, wherein the left optical module has a left display and a left lens that are configured to display a left image in a left eye box through the left vision correction lens and wherein the right optical module has a right display and a right lens that are configured to display a right image in a right eye box through the right vision correction lens;

a left antenna in the left optical module; and a right antenna in the right optical module.

10. The head-mounted device defined in claim 9 wherein the left antenna comprises a left coil that is configured to receive near-field communications signals from the left vision correction lens and wherein the right antenna comprises a right coil that is configured to receive near-field communications from the right vision correction lens.

11. The head-mounted device defined in claim 10 wherein the left coil extends around a peripheral edge of the left lens and wherein the right coil extends around a peripheral edge of the right lens.

12. The head-mounted device defined in claim 11 wherein the near-field communications signals received by the left coil comprise signals at a frequency of less than 100 MHZ.

13. The head-mounted device defined in claim 12 further comprising magnets configured to removably attach the left and right vision correction lenses respectively to the left and right optical modules in alignment with the left and right lenses.

14. The head-mounted device defined in claim 10 wherein the left and right vision correction lenses comprise respective left and right vision correction lens elements and comprise respective left and right near-field communications antennas that respectively surround the left and right vision correction lens elements, and wherein the left and right coils are configured to align respectively with the left and right near-field communications antennas of the left and right vision correction lenses when the left and right vision correction lenses are coupled to the left and right optical modules.

15. The head-mounted device defined in claim 10 further comprising control circuitry configured to take action in response to receiving the near-field communications signals.

16. The head-mounted device defined in claim 15 wherein the near-field communications signals include vision correction information and wherein the control circuitry is configured to take action based on the vision correction information.

17. The head-mounted device defined in claim 15 wherein the near-field communications signals include user information and wherein the control circuitry is configured to take action based on the user information.

18. The head-mounted device defined in claim 9 further comprising magnets configured to removably attach the left and right vision correction lenses respectively to the left and right optical modules in alignment with the left and right lenses.

19. A head-mounted device vision correction lens configured to removably couple to a head-mounted device, comprising:

a vision correction lens housing;

a vision correction lens element in the vision correction lens housing;

a coil in the vision correction lens housing, wherein the coil is configured to form a near-field communications antenna and wherein the coil extends around the vision correction lens element; and near-field communications circuitry coupled to the coil that is configured to transmit near-field communications signals to the head-mounted device using the near-field communications antenna.

20. The head-mounted device vision correction lens defined in claim 19, wherein the near-field communications circuitry is further configured to use the near-field communications antenna to receive wireless power from the head-mounted device.

* * * * *